United States Patent
Xu et al.

(10) Patent No.: US 12,330,821 B2
(45) Date of Patent: *Jun. 17, 2025

(54) AUTONOMOUS DRIVING SYSTEM WITH AIR SUPPORT

(71) Applicant: Nullmax (Hong Kong) Limited, Hong Kong (CN)

(72) Inventors: Lei Xu, Hong Kong (CN); Erkang Cheng, Hong Kong (CN); Tingting Zhu, Hong Kong (CN)

(73) Assignee: Nullmax (Hong Kong) Limited, Hong Kong (CN)

( * ) Notice: Subject to any disclaimer, the term of this patent is extended or adjusted under 35 U.S.C. 154(b) by 102 days.

This patent is subject to a terminal disclaimer.

(21) Appl. No.: 17/672,668

(22) Filed: Feb. 15, 2022

(65) Prior Publication Data
US 2023/0252896 A1  Aug. 10, 2023

Related U.S. Application Data

(60) Provisional application No. 63/308,032, filed on Feb. 8, 2022.

(51) Int. Cl.
*B64U 10/13* (2023.01)
*B64U 101/30* (2023.01)
(Continued)

(52) U.S. Cl.
CPC ............. *B64U 10/13* (2023.01); *G06V 10/82* (2022.01); *G08G 1/0108* (2013.01);
(Continued)

(58) Field of Classification Search
CPC ...... G06V 20/17; G06V 40/103; G08G 1/056; G08G 1/096775; G08G 1/096791;
(Continued)

(56) References Cited

U.S. PATENT DOCUMENTS

2010/0277588 A1* 11/2010 Ellsworth ........... G06F 16/9537
707/769
2019/0227555 A1  7/2019 Sun et al.
(Continued)

FOREIGN PATENT DOCUMENTS

KR  20150123499 A * 11/2015 ............... G05D 1/00

OTHER PUBLICATIONS

U.S. Appl. No. 17/712,493—Non-Final Office Action mailed on Apr. 18, 2024, 52 pages.
(Continued)

*Primary Examiner* — Yuri Kan
(74) *Attorney, Agent, or Firm* — Getech Law LLC; Jun Ye

(57) ABSTRACT

Aspects an autonomous driving system with air support are described herein. The aspects may include an unmanned aerial vehicle (UAV) in the air and a land vehicle on the ground communicatively connected to the UAV. The UAV may include at least one UAV camera configured to collect first ground traffic information and a UAV communication module configured to transmit the collected first ground traffic information. The land vehicle may include one or more vehicle sensors configured to collect second ground traffic information surrounding the land vehicle, a land communication module configured to receive the first ground traffic information from the UAV, and a processor configured to combine the first ground traffic information and the second ground traffic information to generate a world model.

20 Claims, 13 Drawing Sheets

(51) Int. Cl.
*G06V 10/82* (2022.01)
*G08G 1/01* (2006.01)
*G08G 1/0967* (2006.01)
*H04W 4/40* (2018.01)

(52) U.S. Cl.
CPC ......... *G08G 1/0125* (2013.01); *G08G 1/0141* (2013.01); *G08G 1/0145* (2013.01); *G08G 1/096725* (2013.01); *G08G 1/096766* (2013.01); *H04W 4/40* (2018.02); *B64U 2101/30* (2023.01)

(58) Field of Classification Search
CPC .... G08G 5/26; G08B 13/19608; G06T 7/579; G06T 17/00; G06T 7/74; H04W 4/024; G09B 29/004; G06F 16/9537; G05D 1/00; G01S 17/89
See application file for complete search history.

(56) References Cited

U.S. PATENT DOCUMENTS

| | | | |
|---|---|---|---|
| 2020/0026289 A1 | 1/2020 | Alvarez et al. | |
| 2020/0109954 A1 | 4/2020 | Li et al. | |
| 2020/0160735 A1 | 5/2020 | Kim et al. | |
| 2020/0320313 A1* | 10/2020 | Huang | G08G 1/096775 |
| 2021/0016735 A1 | 1/2021 | Radetzki et al. | |
| 2021/0046925 A1 | 2/2021 | Bonkoski et al. | |
| 2021/0131821 A1* | 5/2021 | Wang | G09B 29/004 |
| 2021/0132612 A1* | 5/2021 | Wang | H04W 4/024 |
| 2021/0134156 A1 | 5/2021 | Lee | |
| 2021/0183161 A1* | 6/2021 | Upendran | G06T 17/00 |
| 2021/0304577 A1* | 9/2021 | Hollar | G08B 13/19608 |
| 2021/0325898 A1 | 10/2021 | Golov | |
| 2022/0009630 A1 | 1/2022 | Jeong et al. | |
| 2022/0234733 A1* | 7/2022 | Holtz | G06V 20/17 |
| 2022/0301192 A1* | 9/2022 | Boardman | G06T 7/579 |
| 2023/0230471 A1 | 7/2023 | Guney et al. | |
| 2023/0252903 A1* | 8/2023 | Xu | G08G 1/056 701/3 |

OTHER PUBLICATIONS

PCT/US23/62163—International Search Report and Written Opinion mailed on Jun. 22, 2023, 15 pages.
U.S. Appl. No. 17/712,493—Final Office Action mailed on Dec. 13, 2024, 43 pages.

* cited by examiner

AUTONOMOUS DRIVING SYSTEM WITH AIR SUPPORT

TECHNICAL FIELD

The present disclosure generally relates to the technical field of autonomous driving, and specifically, relates to an apparatus and method for autonomous driving with air support.

BACKGROUND

Autonomous driving systems have been proposed to replace the manual driving mode in which a vehicle travels under the control of the driver. An autonomous driving vehicle, or autonomous driving systems embedded therein, typically includes multiple sensors to detect the objects around the vehicle. Those objects should be promptly detected and located to avoid possible collision with the vehicle. Many of the existing autonomous driving systems includes Light Detection and Ranging (LiDAR) devices, cameras, or Radio Detection and Ranging (radar) sensors.

However, none of these sensors can detect objects blocked by another object, for examples, a pedestrian running behind another vehicle. Those sensors also have difficulties to detect other vehicles in a low visibility weather. Even on a sunny day, the range of those sensors are also limited to around one hundred meters, if not further.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example autonomous driving system. The example autonomous driving system may include an unmanned aerial vehicle (UAV) in the air. The UAV may include at least one UAV camera configured to collect first ground traffic information, and a UAV communication module configured to transmit the collected first ground traffic information. The example autonomous driving system may further include a land vehicle communicatively connected to the UAC in the air. The land vehicle may include one or more vehicle sensors configured to collect second ground traffic information surrounding the land vehicle, a land communication module configured to receive the first ground traffic information from the UAV, and a processor configured to combine the first ground traffic information and the second ground traffic information to generate a world model.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1:
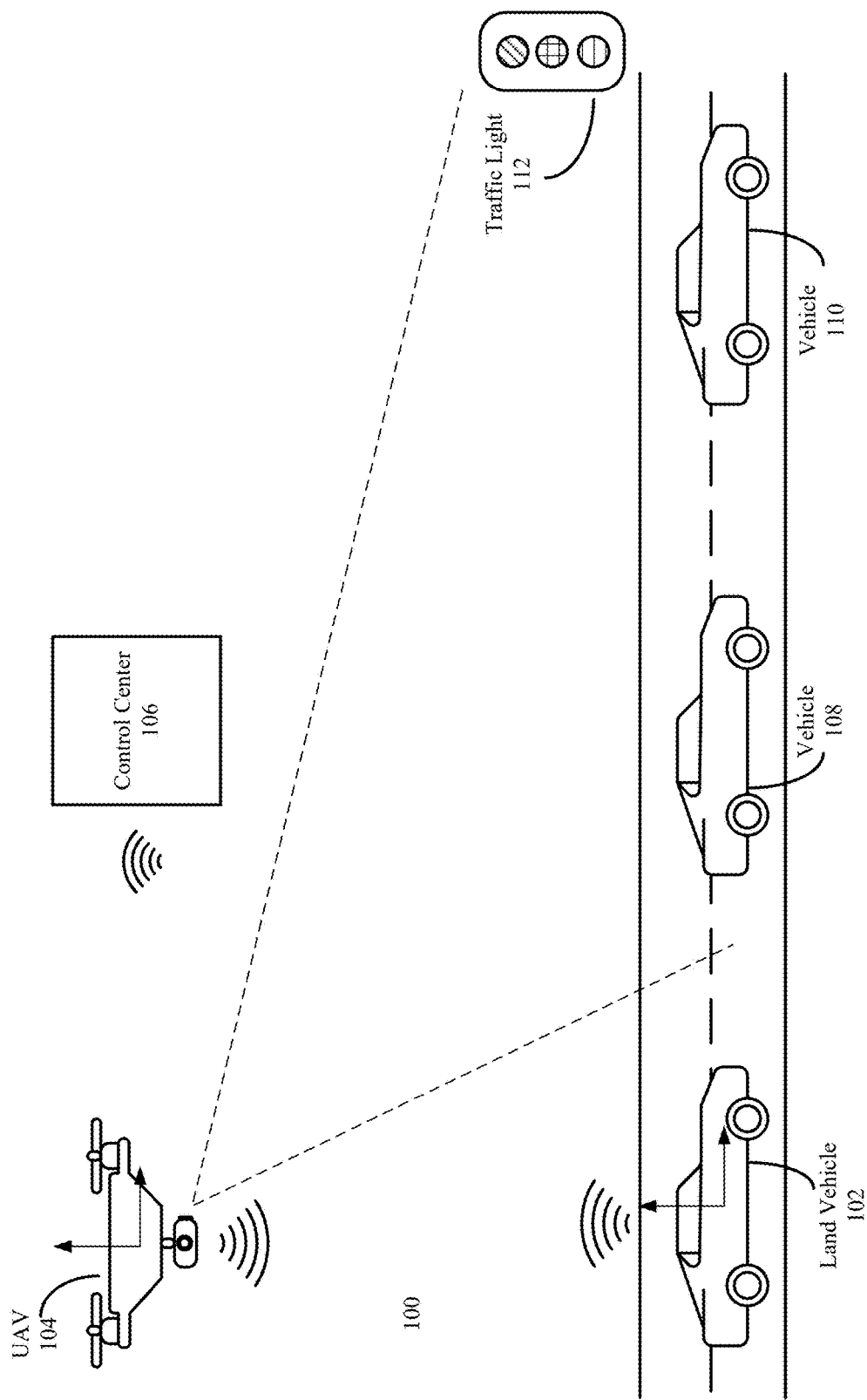
FIG. 1 illustrates a diagram showing an autonomous driving system with air support in accordance with the disclosure.

FIG. 1 illustrates a diagram showing an example autonomous driving system 100 with air support in accordance with the disclosure.

As depicted, the example autonomous driving system 100 includes a land vehicle 102 on the ground and an unmanned aerial vehicle (UAV) 104 in the air. In some examples, the UAV 104 may be a drone stored in the land vehicle 102 for charging and released or launched if preferred. In some other examples, the UAV 104 may be any vehicle above the ground, e.g., a satellite.

When the UAV 104 is released and hovering above the land vehicle, multiple sensors of the UAV 104 may be configured to collect ground traffic information. In some examples, the UAV 104 may include camera sensors, radar sensors, and/or LiDAR sensors. As the UAV 104 is in the air, the sensors of UAV 104 may capture more, or at least different, ground traffic information. For example, as depicted here, when the land vehicle 102 is traveling behind a vehicle 108, sensors on the land vehicle 102 may not be able to capture any information of a vehicle 110 in front of the vehicle 108. In some other examples, an exit or a sharp turn on the road may be blocked by the vehicles 108 and 110 such that the sensors on the land vehicle 102 may not be able to detect the exit. Unlike the sensors on the land vehicle 102, the sensors on UAV 104 may be able to gather ground traffic information typically unperceivable or undetectable by the sensors on the land vehicle 102.

In some examples, the sensors on the UAV 104 may be configured to collect raw sensor information, such as visual images and/or distances from ground objects to the UAV 104. The raw sensor information, e.g., visual images and the distances, may be further converted, by a processor of the UAV 104, to ground traffic information in a three-dimensional (3D) coordinate system ("first ground traffic information" hereinafter). The position of the UAV 104 may be the coordinate origin of the 3D coordinate system. The conversion from the collected visual images and distance information may be performed by a processor of the UAV 104. Alternatively, the collected visual image and the distance information may be transmitted to a control center 106 or the land vehicle 102. The conversion can also be performed a processor of the control center 106 or a processor on the land vehicle 102.

In some examples, the first ground traffic information may include a position of the land vehicle 102 in the 3D coordinate system, positions of the still objects on the ground (e.g., curbside, lane dividing lines, stop sign, etc.), positions and motion information (such as velocity and acceleration) of the moving objects on the ground (e.g., pedestrian, other land vehicles, etc.), status information of the traffic signals (e.g., traffic light 112), and area information that indicates areas accessible to the land vehicle 102 from the perspective of the UAV 104. The positions of the first ground traffic information may be formed as sets of coordinates in the 3D coordinate system, one or more point clouds, one or more semantic segments, or features of those objects.

While the land vehicle 102 is on the road, the sensors (e.g., camera sensors, radar sensors, and/or LiDAR sensors) on the land vehicle may be configured to collect raw sensor information surrounding the land vehicle 102. Similarly, for example, visual images and/or distance information of surrounding objects may be collected by the sensors on the land vehicle. The collected raw sensor information, such as visual image and the distance information, may further converted, by a processor of land vehicle 102, to ground traffic information in a two-dimensional (2D) coordinate system ("second ground traffic information" hereinafter). The position of the land vehicle 102 may be the coordinate origin of the 2D coordinate system.

Similarly, the second ground traffic information may include positions of the still objects on the ground (e.g., curbside, lane dividing lines, stop sign, etc.), positions and motion information such as velocity and acceleration of the moving objects on the ground (e.g., pedestrian, other land vehicles, etc.), status information of the traffic signals, and area information that indicates areas accessible to the land vehicle 102 from the perspective of the land vehicle 102.

The ground traffic information collected by the UAV 104 and the land vehicle 102 respectively may be further combined to generate a world model. The world model may include a combination of the information collected respectively by the UAV 104 and the land vehicle 102. In some examples, the first ground traffic information in the 3D coordinate system may be converted to the 2D coordinate system with the land vehicle 102 as the coordinate origin. Such conversion may be performed by a processor of the UAV 104, a processor of the land vehicle 102, or a processor at the controller center 106. The process of generating the world model is further described in more detail in accordance with FIGS. 5 and 8-11.

As the world model includes the position information of those objects that are difficult to be perceived by the sensors on the land vehicle 102, it become more efficient, maybe safer, to control the routing, the behavior, and the motion of the land vehicle based on the world model. For example, when the world model includes the velocities and accelerations of the vehicles 108 and 110, the processor of the land vehicle may be configured to generate an instruction to pass the vehicle 108 if the distance between the vehicles 108 and 110 is and will be safe for a time period sufficient for passing.

From the perspective of the complexity entropy system, the vehicle-UAV cooperative autonomous driving introduces the intelligent element of entropy reduction to counter the entropy increase of the natural iterative growth of the single-vehicle intelligent automatic driving system. Through vehicle-UAV collaboration, the perception and collaborative planning capabilities of the air-side subsystem can be introduced to solve the problem of blind spot perception, while expanding the perception range and improving the safety and robustness of decision-making and planning. In addition, vehicle-UAV collaboration is more conditional for data accumulation and collaboration, and further enhances individual single-vehicle intelligence and learning growth intelligence through data mining. In this way, the vehicle-UAV synergy introduces orthogonal elements such as high-dimensional data of UAV-side intelligence and realizes a new intelligence of entropy reduction against the entropy increase of system complexity.

Figure 2:
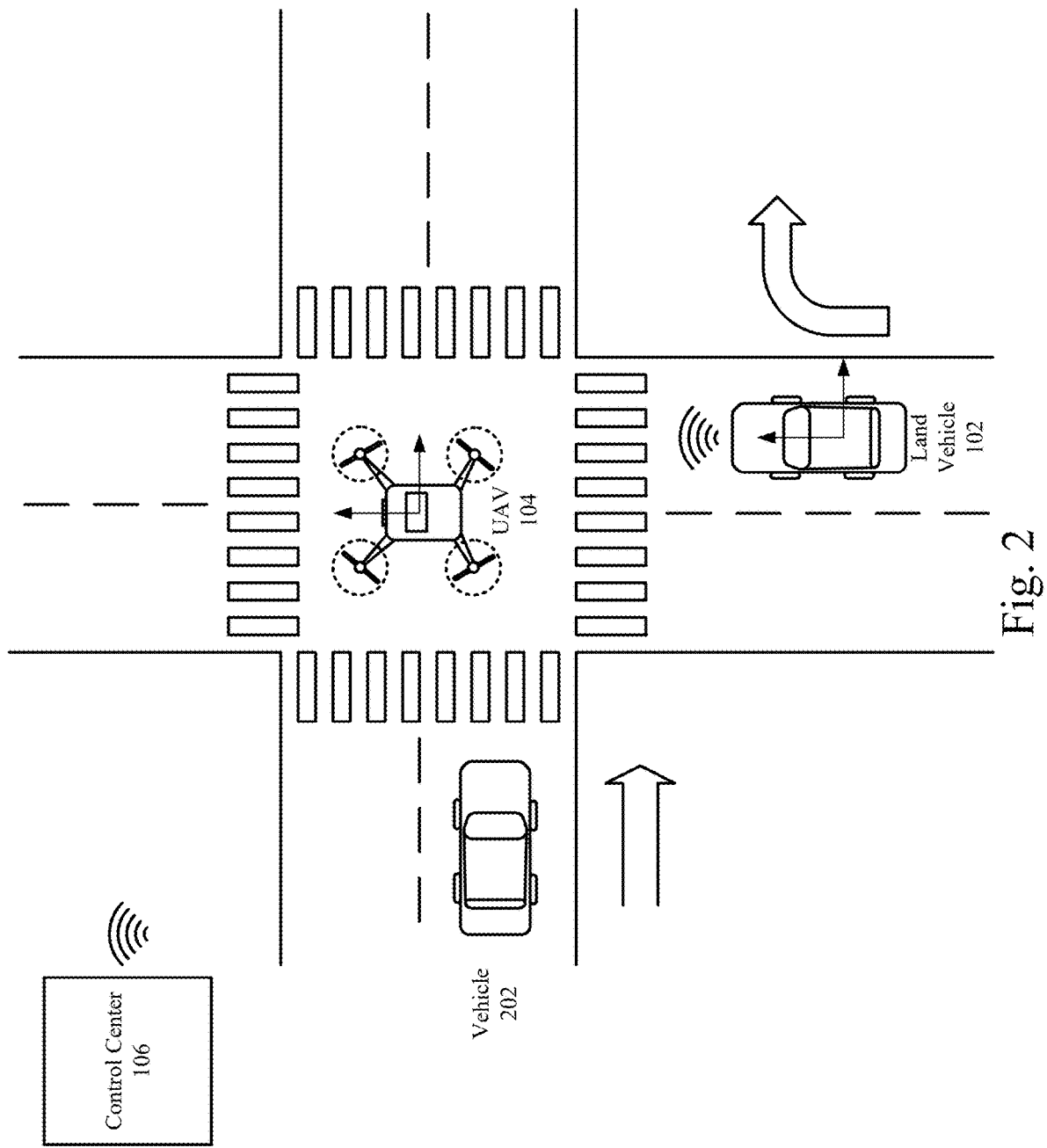
FIG. 2 illustrates a diagram showing the autonomous driving system with air support in accordance with the disclosure.

FIG. 2 illustrates a diagram showing the example autonomous driving system with air support in accordance with the disclosure.

As an example scenario depicted in FIG. 2, when the land vehicle 102 detects that the land vehicle 102 is approaching an intersection, the UAV 104 may be released to the air and fly toward the interaction before the land vehicle 102, typically before the land vehicle 102 reaches the intersection. In some examples, the UAV 104 may be in the air following or leading the land vehicle 102 during the trip.

When the UAV 104 is close to or around the intersection, the sensors of UAV 104 may be configured to collect the first ground traffic information including the positions of the crosswalks, the lane dividing lines, the curbsides, or a moving vehicle 202. The first ground traffic information may then be combined with the second ground traffic information by a processor of the land vehicle 102 or the control center 106 to generate the world model. As the world model includes the motion information collected in the first ground traffic information by the UAV 104, a processor of the land vehicle 102 may be configured to determine the speed of a right turn of the land vehicle 102, or whether the land vehicle 102 needs to stop to yield in the case that the velocity of the moving vehicle 202 reaches a given threshold.

Figure 3:
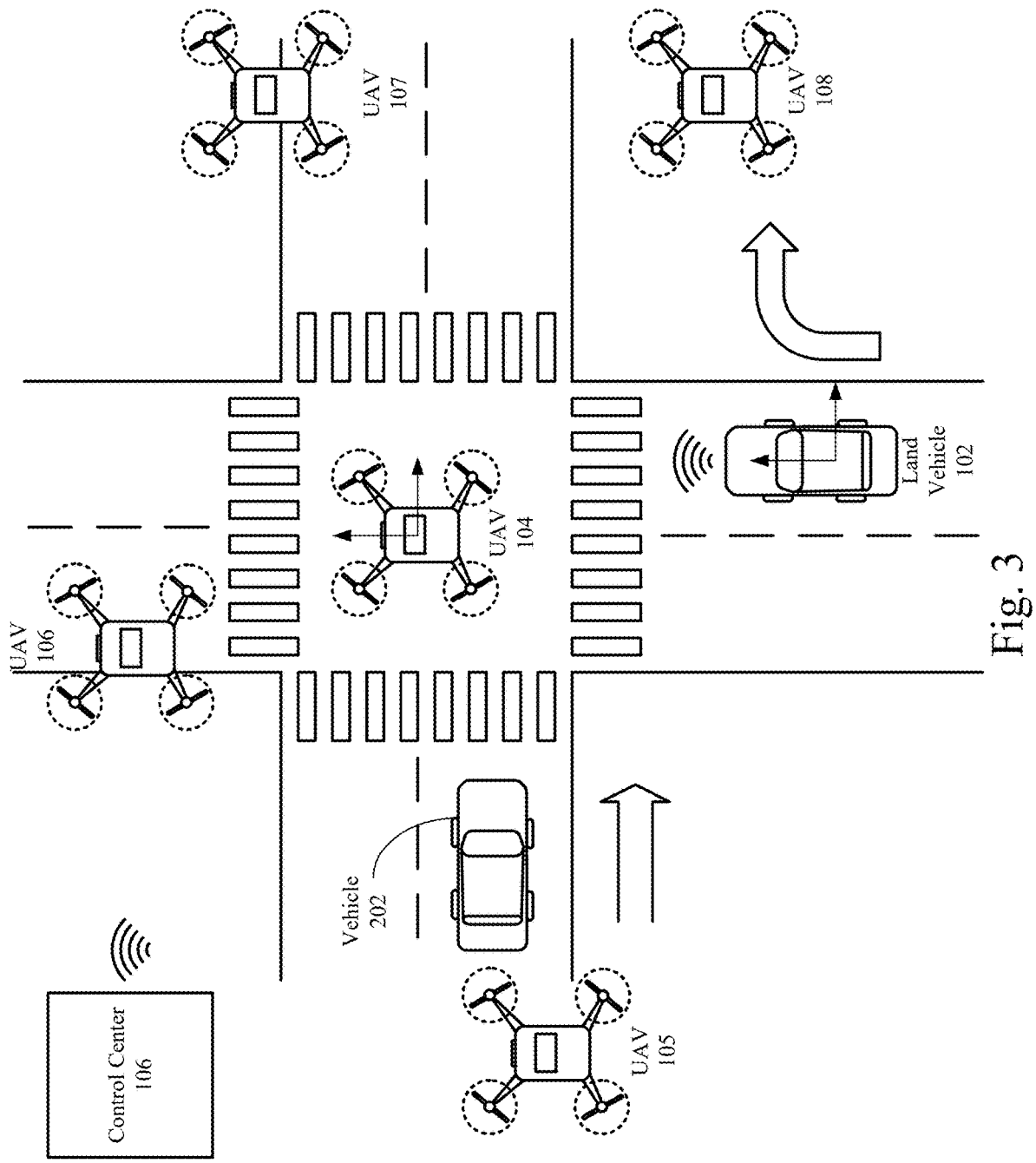
FIG. 3 illustrates a diagram showing another autonomous driving system with air support in accordance with the disclosure.

FIG. 3 illustrates a diagram showing another autonomous driving system with air support in accordance with the disclosure.

As depicted, one or more UAVs (e.g., UAVs 104-107) may be hovering near the intersection. These UAVs may be originally paired to different land vehicles respectively or a part of smart city infrastructure collecting information for traffic control government agencies. These UAVs may be communicatively connected to each other, to the land vehicle 102, or to the control center 106. In the example, the first ground traffic information collected/generated respectively by the UAVs 104-107 may be transmitted to the land vehicle 102, the control center 106, or any of the UAVs 104-107 to generate the world model.

Since first ground traffic information collected/generated respectively by the UAVs 104-107 theoretically includes traffic information of a larger geographic range, the world model may include information of more moving objects. The decisions of the autonomous driving made based upon the world model may be safer or more efficient. For example, the processor on the land vehicle 102 may force a hard stop if the world model includes motion information of a running person around the blind spot of the land vehicle 102.

Figure 4:
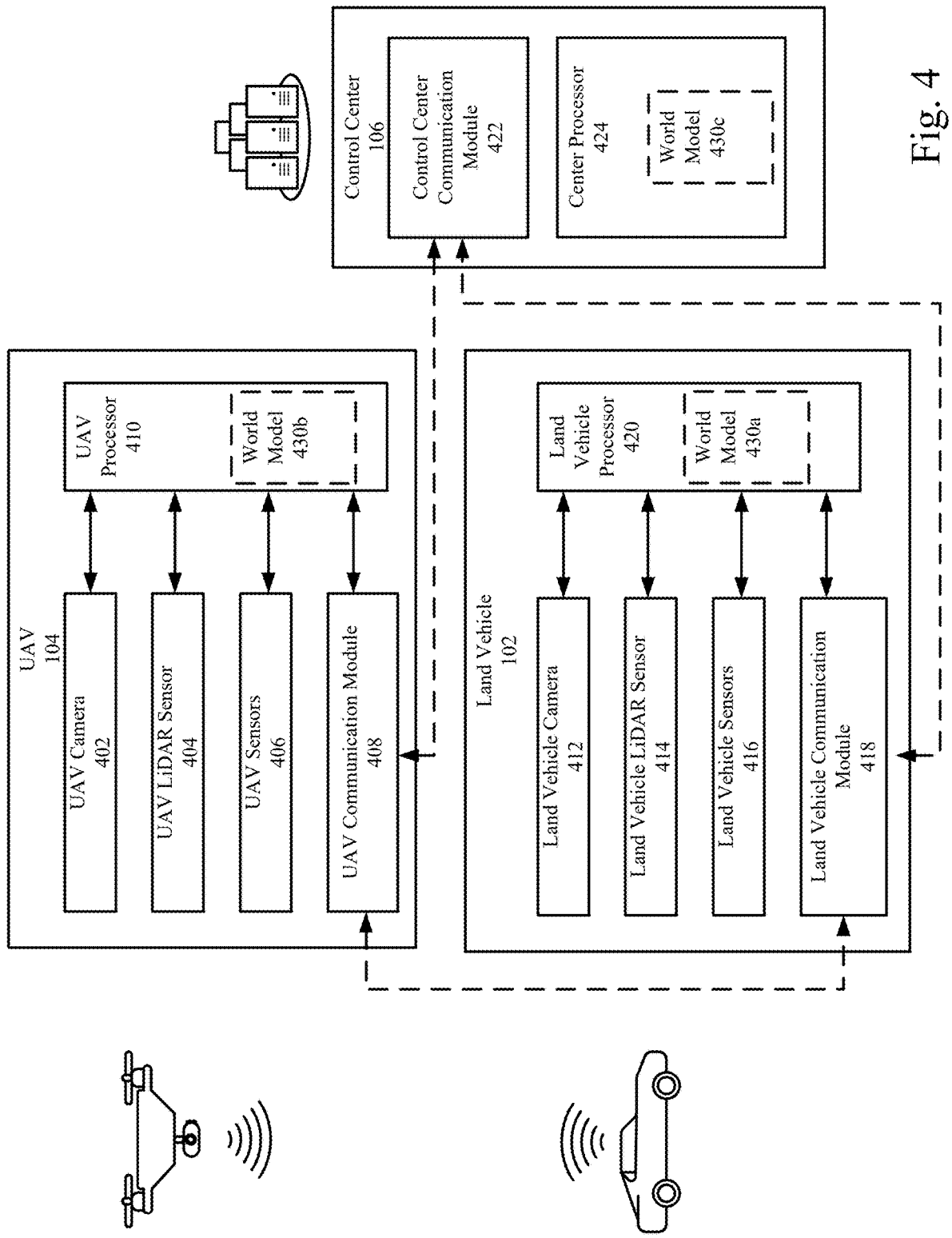
FIG. 4 illustrates a diagram showing example components of the autonomous driving system with air support in accordance with the disclosure.

FIG. 4 illustrates a diagram showing example components of the autonomous driving system with air support in accordance with the disclosure.

As depicted, the UAV 104 may include sensors such as one or more UAV camera 402, one or more UAV LiDAR sensor, other UAV sensors (e.g., radar sensors). The UAV camera 402 may be configured to capture images of the ground traffic. The UAV LiDAR sensor may be configured to determine distance information of the objects on the ground, i.e., distances between ground objects to the UAV 104. Other UAV sensors 406 such as radar sensors may be similarly configured to determine the distance information of the ground objects. The collected images and distance information may be sent to a UAV processor 410 to be converted to the first ground traffic information. The first ground traffic information may then be transmitted to the land vehicle 102 via a UAV communication module 408. The UAV communication module 408 may be in communication with a land vehicle communication module 418 and/or a control center communication module 422 in accordance with wireless communication protocols such as Wi-Fi, Bluetooth, ZigBee, Z-Wave, MiWi, etc. In other examples, the images and the distance information may be sent, via the UAV communication module 408, to the land vehicle 102 or the control center 106 for the conversion.

The land vehicle may include sensors such as one or more land vehicle camera 412, one or more land vehicle LiDAR sensor, other land vehicle sensors (e.g., radar sensors). Similarly, the land vehicle camera 412 may be configured to capture images of the ground traffic surrounding the land vehicle 102. The land vehicle LiDAR sensor 414 and other land vehicle sensors 416 may be configured to distance information of the surrounding objects. Typically, sensors on the land vehicle 102 may collect traffic information within several hundred meters of the land vehicle 102.

Similarly, the collected images and distance information may be sent to a land vehicle processor 420 to be converted to the second ground traffic information. In some other examples, the collected images and distance information may be sent to the UAV 104 or the control center 106 for the conversion.

Based on the first ground traffic information collected by the UAV 104 and the second ground traffic information collected by the land vehicle 102, the land vehicle processor 420 may be configured to generate the world model. Notably, in at least some examples, the generating of the world model may be performed by the UAV processor 410 or the center processor 424.

Based on the world model, the land vehicle processor 420 may be configured to generate decisions for the land vehicle 102.

Figure 5:
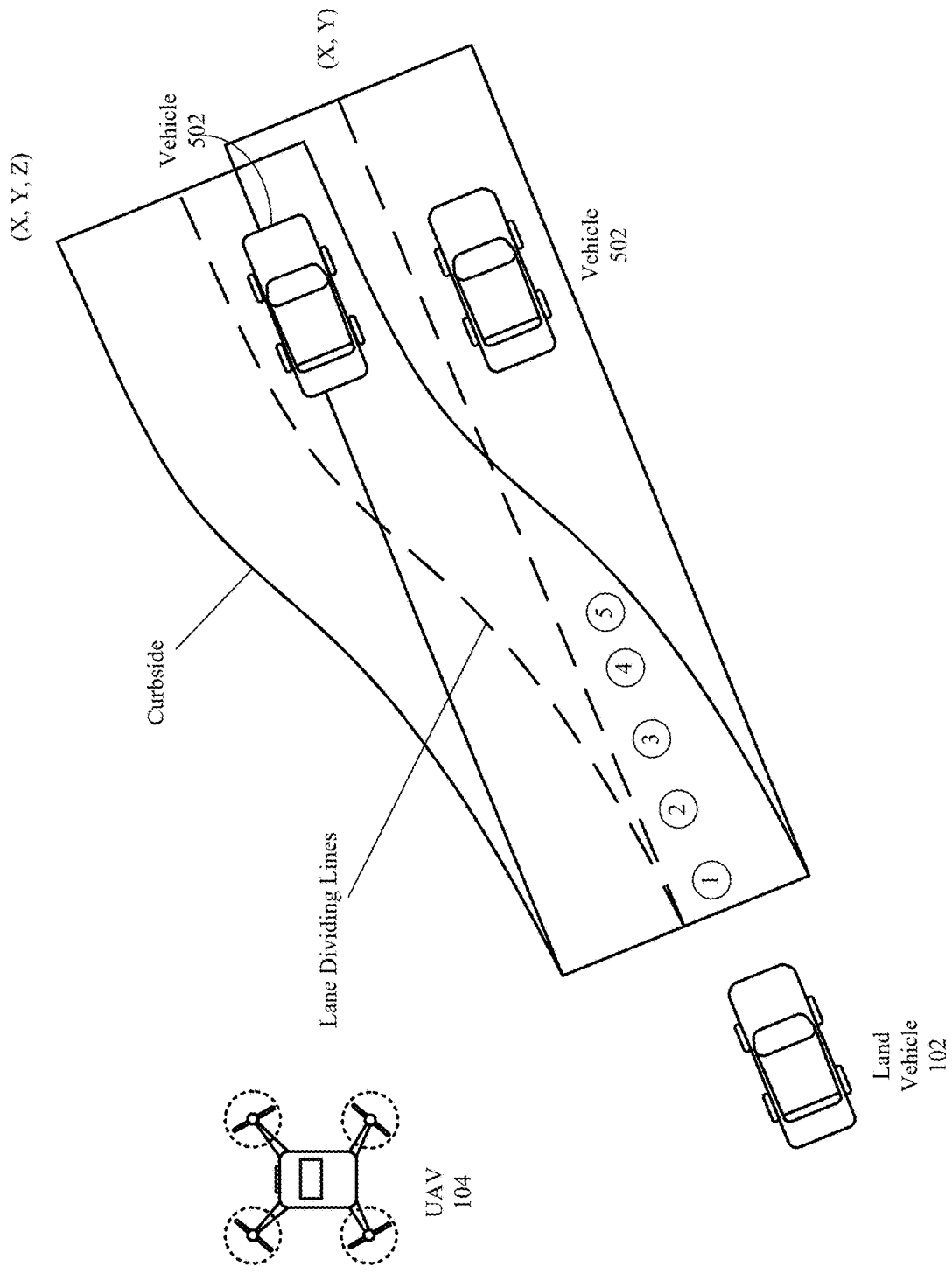
FIG. 5 illustrates a diagram showing a conversion of traffic information in the example autonomous driving system with air support in accordance with the disclosure.

FIG. 5 illustrates a diagram showing a conversion of traffic information in the example autonomous driving system with air support in accordance with the disclosure.

As depicted, the processor of the UAV 104 may be configured to generate the first ground traffic information in the 3D coordinate system. In the 3D coordinate system, each of the ground objects may be associated with one or more sets of coordinates. For example, each segment of the land dividing lines may be associated with two sets of coordinates that indicate a beginning and an end thereof. A vehicle 502 may be associated with four sets of coordinates that respectively indicate four corners of a virtual boundary box that encloses the vehicle 502.

Some of the objects may be formatted as function curves in the 3D coordinate system, e.g., $$\begin{bmatrix} x \\ z \end{bmatrix} = \begin{bmatrix} \sum_{r=0}^{R} a_r y^r \\ \sum_{r=0}^{R} b_r y^r \end{bmatrix}.$$

Some other objects may be formatted as a chain of links.

For example, each segment of the lane dividing lines may be associated with a number of itself and a number of the next segment.

In some other examples, each of the ground objects may be represented as a semantic segment (or instance segment). The semantic segment may also be associated with coordinates in the 3D coordinate system. Additionally, each semantic segment may include a probability of a category to which the object belongs. For example, a portion of the curbside may be represented as "(x, y, z) (95%) (curbside)" showing the object at coordinate (x, y, z) is highly likely to be a curbside.

In some other examples, each of the ground objects may be represented as a point cloud that include a set of data points in space. Each of the data points may be associated with a set of coordinates.

Additionally, some of the ground objects may be associated with a direction to which the objects are facing. For example, the direction of a bike, a pedestrian, or a car may be determined based on the images collected by the UAV camera 402.

Additionally, motion information may be associated to each moving object on the ground. For example, velocity formatted as ($v_x$, $v_y$, $v_z$) and acceleration formatted as ($a_x$, $a_y$, $a_z$) may be associated with the vehicle 502. In some examples, the first ground traffic information may include predicted trajectories of the moving objects on the ground. The predicted trajectories of the moving objects may be generated by the UAV processor 410 in accordance with some existing approaches, e.g., model based approach and/or data driven approach.

Different from the first ground traffic information from the perspective of the UAV 104, the second ground traffic information is represented in a 2D coordinate system with the position of the land vehicle 102 being the coordinate origin. The second ground traffic information may similarly include coordinates of the ground objects, 2D function curves in the 2D coordination system to represents some of the ground objects, semantic segments of some ground objects, point clouds of some ground objects, directions to which some objects face, motion information of some moving objects on the ground, predicted trajectories of the moving objects.

During the process of generating the world model, the first ground traffic information may be converted to the 2D coordinate system. The positions of the ground objects in the 3D coordinate system may be aligned with those positions of the same objects in the 2D coordinate system to generate the world model.

For example, the land vehicle processor 420, the UAV processor 410, or the center processor 424, may be configured to convert coordinates of one or more still objects, one or more moving objects, one or more traffic signals, and one or more accessible areas identified in the 3D coordinate system to coordinates in the 2D coordinate system; and determine coordinates of the one or more still objects, the one or more moving objects, the one or more traffic signals, and the one or more accessible areas in the world model based on the converted coordinates and the second ground traffic information.

In other examples, the land vehicle processor 420, the UAV processor 410, or the center processor 424, may be configured to convert semantic segments of one or more still objects, one or more moving objects, one or more traffic signals, and one or more accessible areas identified in the 3D coordinate system to semantic segment in the 2D coordinate system; and determine semantic segments of the one or more still objects, the one or more moving objects, the one or more traffic signals, and the one or more accessible areas identified in the world model based on the converted semantic segment and the second ground traffic information.

In yet other examples, the land vehicle processor 420, the UAV processor 410, or the center processor 424, may be configured to convert point clouds of one or more still objects, one or more moving objects, one or more traffic signals, and one or more accessible areas identified in the 3D coordinate system to point clouds in the 2D coordinate system; and determine point clouds of the one or more still objects, the one or more moving objects, the one or more traffic signals, and the one or more accessible areas identified in the world model based on the converted point clouds and the second ground traffic information.

The conversion of the coordinate systems is described in greater detail below.

Figure 6:
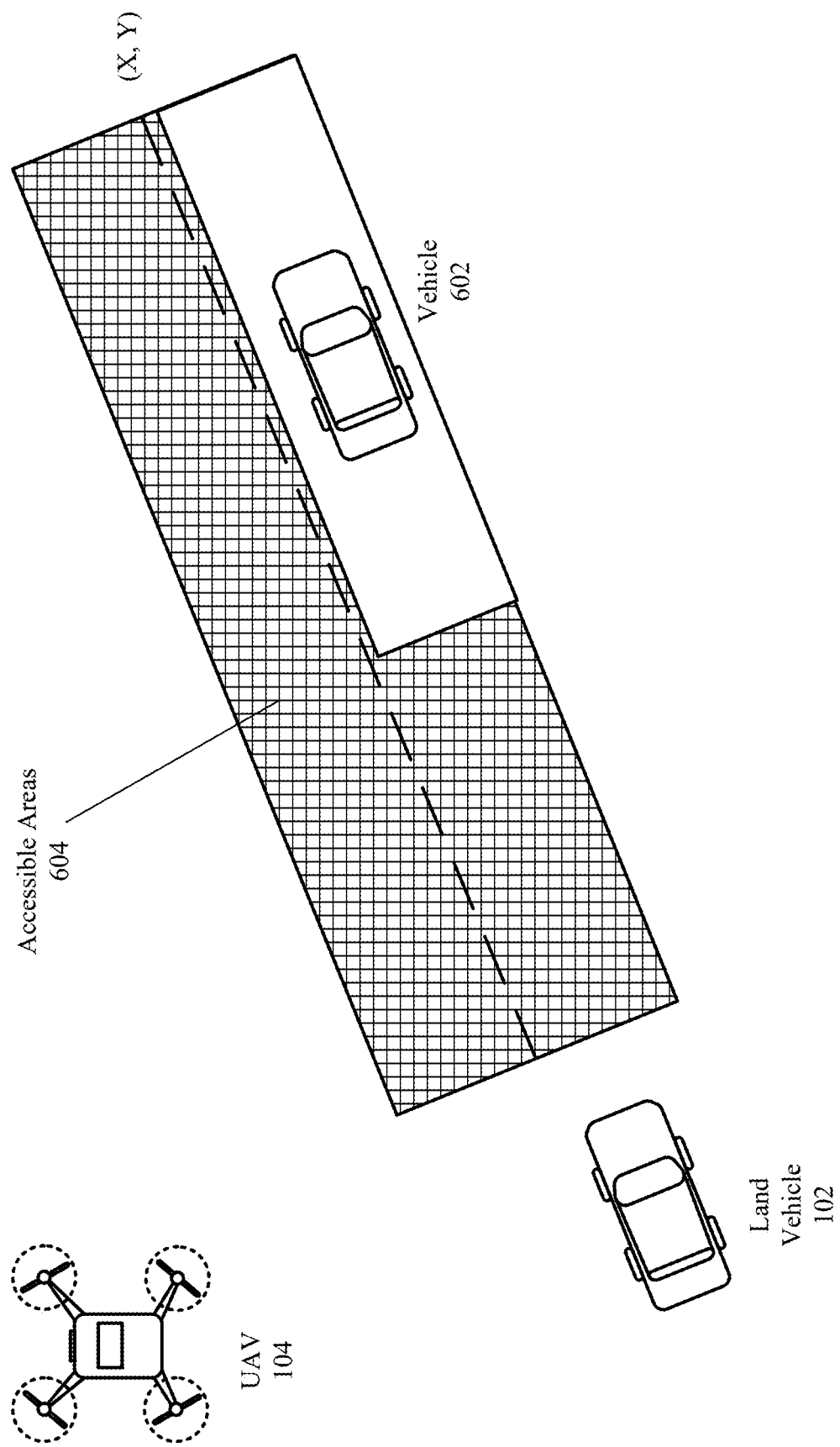
FIG. 6 illustrates a diagram showing a detection of accessible areas by the example autonomous driving system with air support in accordance with the disclosure.

FIG. 6 illustrates a diagram showing a detection of accessible areas by the example autonomous driving system with air support in accordance with the disclosure.

As described above, the first ground traffic information and the second ground traffic information may include area information that indicates the areas accessible to the land vehicle 102. The areas may also be identified as sets of coordinates. Thus, the world model may also indicate the accessible areas as marked in patterns in FIG. 6. In some examples, the determination of the accessible areas 604 may be based on traffic rules and motion information of the ground objects and dynamically adjusted. For example, when the vehicle 602 is detected to apply a hard brake, the accessible areas 604 may be adjusted such that the land vehicle 102 may keep a safe distance.

Figure 7:
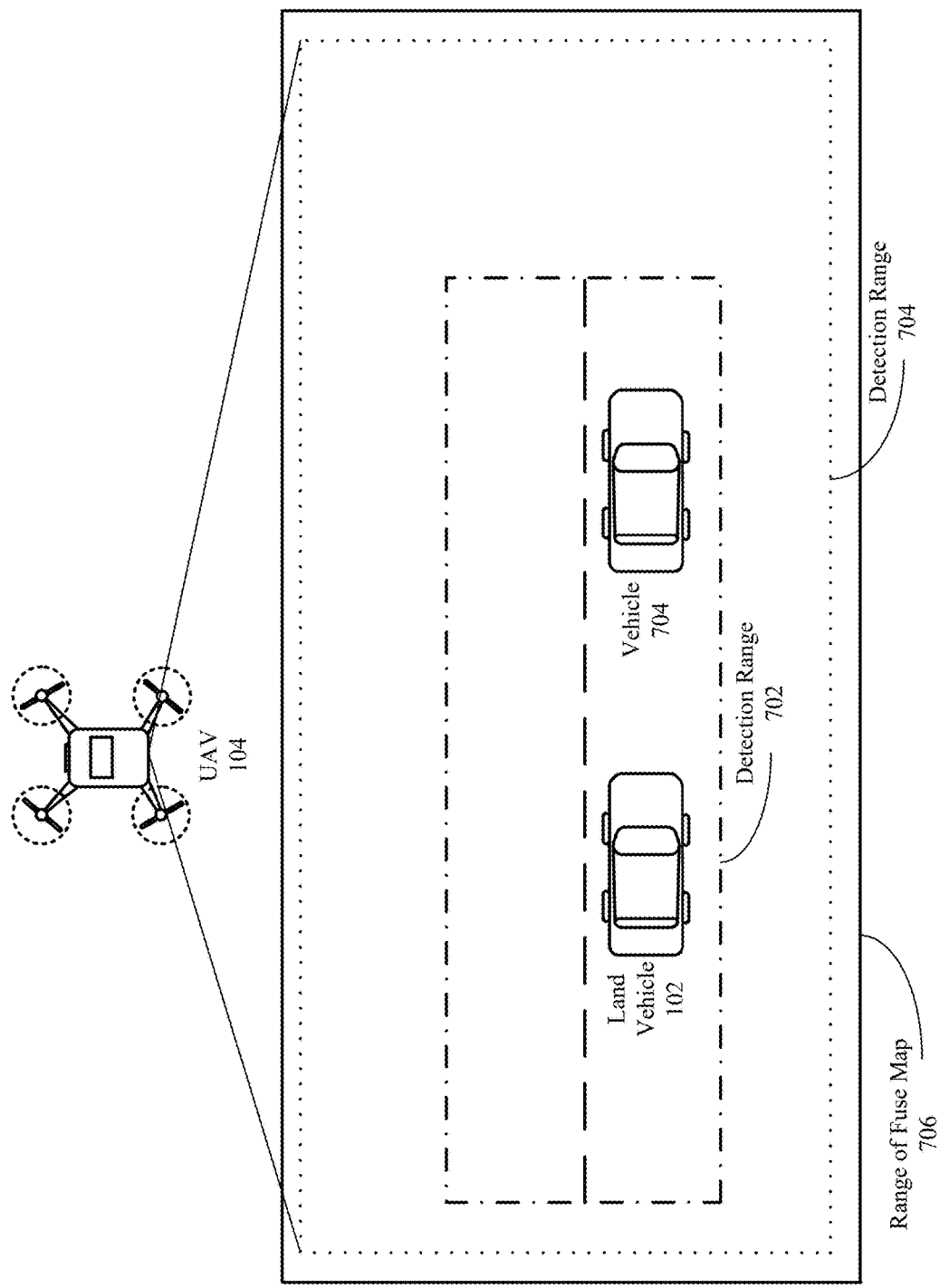
FIG. 7 illustrates a diagram showing a combined detection range of the example autonomous driving system with air support in accordance with the disclosure.

FIG. 7 illustrates a diagram showing a combined detection range of the example autonomous driving system with air support in accordance with the disclosure.

As shown, due the limits of the sensors on the land vehicle 102, the detection range 702 of the land vehicle 102 may be within several hundred meters from the land vehicle 102. Since the sensors on the UAV 104 may collect information that normally cannot be perceived by the sensors on the land vehicle 102, a detection range 704 of the UAV 104 may be much larger than the detection rage 702.

Further, because the world model essentially includes a combination of the first ground traffic information and the second ground traffic information, the range of the world model may be greater than, or at least equal to, the detection range 704 of the UAV 104.

Figure 8:
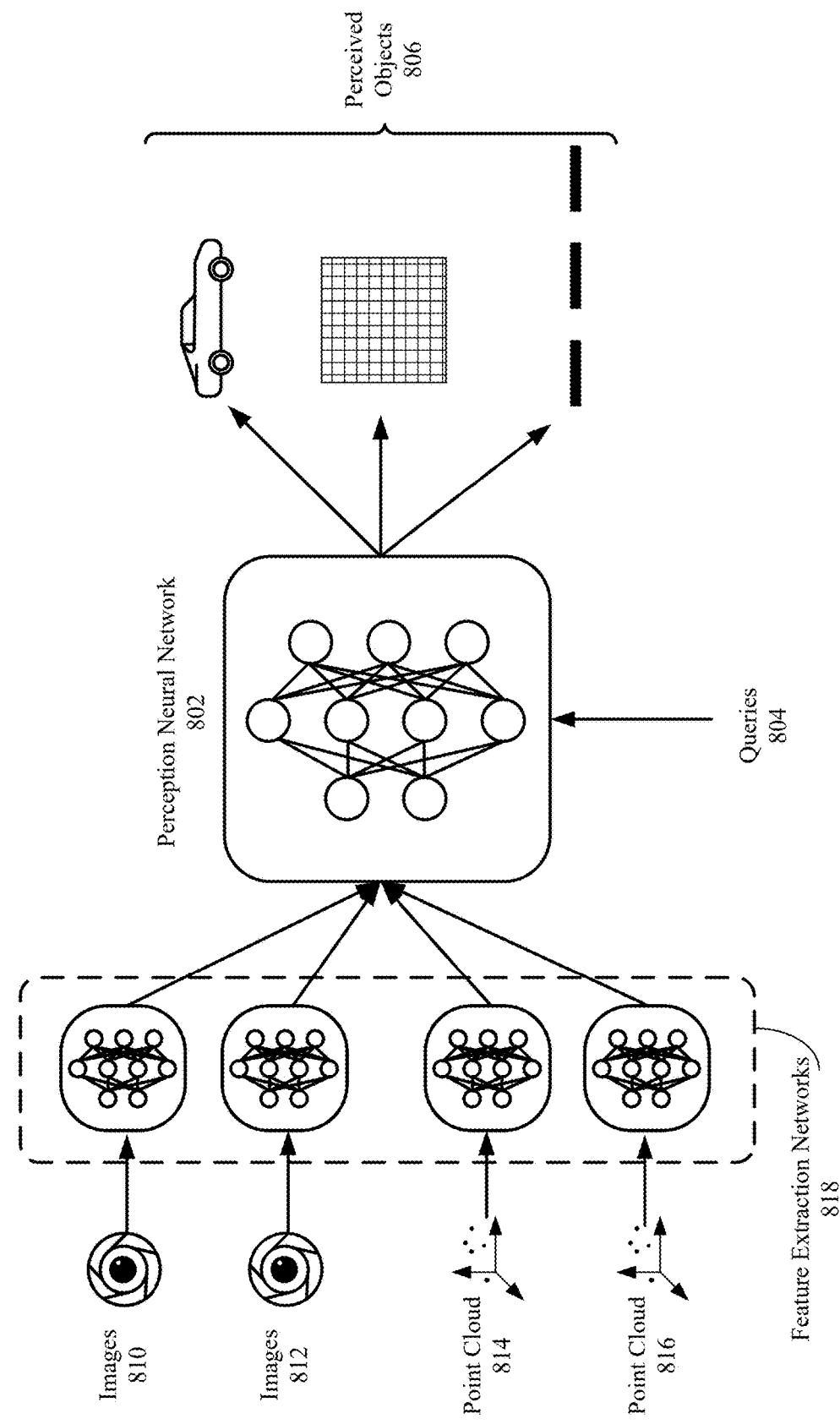
FIG. 8 illustrates a diagram showing an example perception neural network in the example autonomous driving system with air support in accordance with the disclosure.

FIG. 8 illustrates a diagram showing an example perception neural network in the example autonomous driving system with air support in accordance with the disclosure.

As shown, the images and the position information (e.g., images 810 and 812, LiDAR points such as point clouds 814 and 816) respectively collected by the sensors of the UAV 102 and the land vehicle 102 (e.g., UAV camera 402, UAV LiDAR sensor 404, UAV sensors 406, land vehicle camera 412, land vehicle LiDAR sensor 414, land vehicle sensors 416, etc.) may be input to a perception neural network 802 via one or more feature extraction networks 818. The feature extraction networks 818 may be configured to extract features from the images and the position information. The extracted features may then be input into the perception neural network 802.

A system administrator (a person) may label the objects on the images 810 and 812 based on his/her experience to set ground truth values of the perception neural network 802. With sufficient teaching input by the system administrator, the perception neural network 802 may detect the objects described in the images and the position information and output perceived objects 806 (e.g., other vehicles on the road, accessible areas, lane dividing lines, etc.) as the results.

Figure 9:
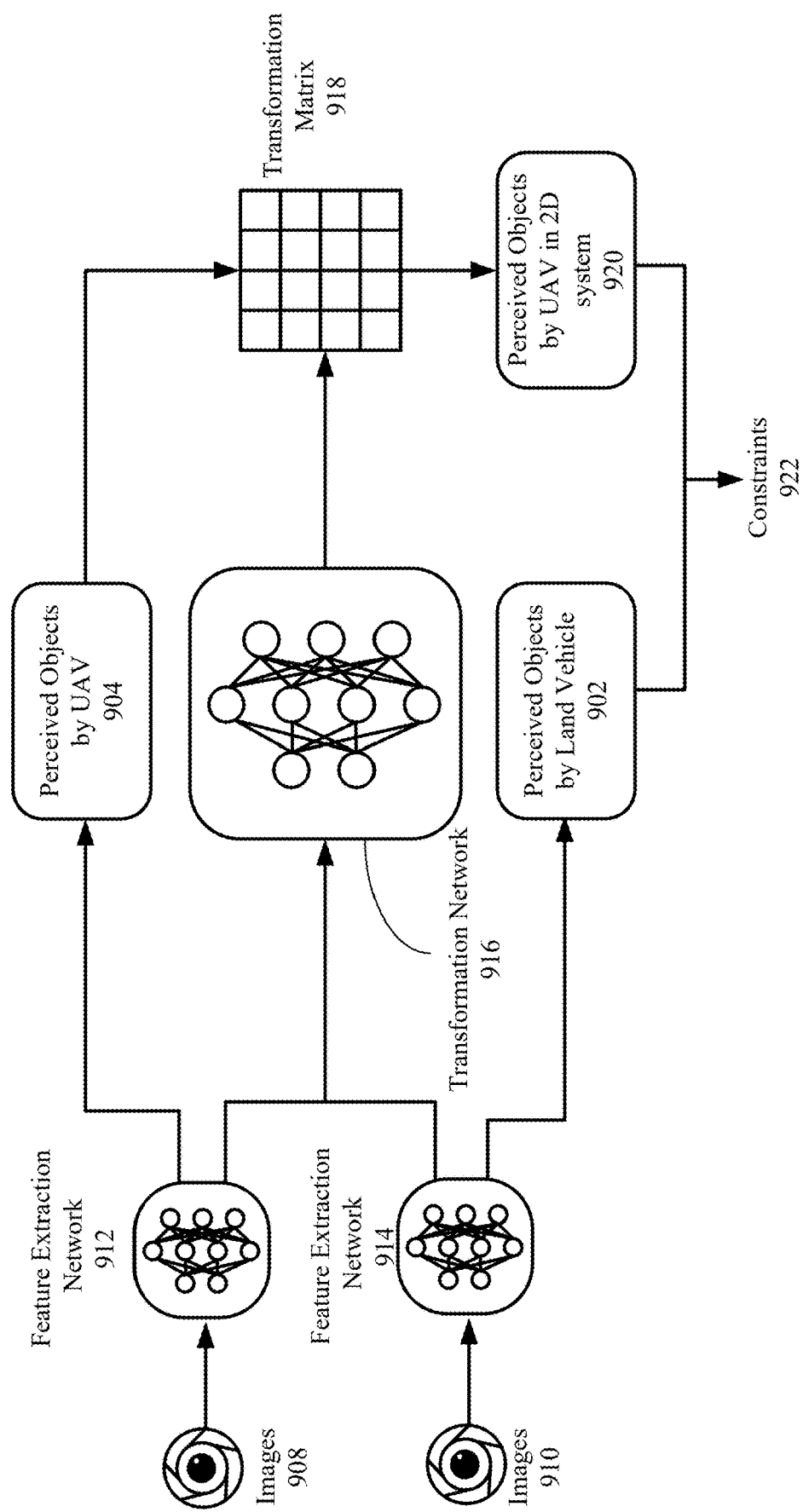
FIG. 9 illustrates a diagram showing an example transformation neural network in the example autonomous driving system with air support in accordance with the disclosure.

FIG. 9 illustrates a diagram showing an example transformation neural network in the example autonomous driving system with air support in accordance with the disclosure.

As described above, the first ground traffic information may be converted into the 2D coordinate system to be consistent with the second ground traffic information; the first ground traffic information and the second ground traffic information may then be combined to generate the world model. The world model may include information of the objects perceivable to the sensors of the UAV 104 or to the sensors of the land vehicle 102. A transformation network 916 may be configured to output a transformation matrix 918 that can convert the coordinates in the 3D coordinate system to coordinates in the 2D coordinate system.

Images 908 collected by the UAV camera, e.g., 402, may be sent to a feature extraction network 912 to extract features of the objects contained in the images 908. When properly trained, the feature extraction network 912 may output features of those perceived objects by UAV 904.

Similarly, images 910 collected by the land vehicle camera, e.g., 412, may be sent to a feature extraction network 914 to extract features of the objects contained in the images 910. When properly trained, the feature extraction network 914 may output features of the perceived objects by land vehicle 902.

Features of both the perceived objects by UAV 904 and the perceived objects by land vehicle 902 may be combined and input to the transformation network 916. After training, the transformation network 916 may output the transformation matrix 918. With the transformation matrix 918, features of the perceived objects by UAV 904 may be converted to features of objects in the 2D coordinate system. The features of the perceived objects by UAV in 2D system 920 may be compared to the perceived objects by land vehicle 902 to determine if the features of the objects perceived by the UAV 104 and the land vehicle 102 are consistent after converting the coordinates. The results of the comparison may be fed back to the transformation network 916 as constraints to further train the transformation network 916 to yield a better transformation matrix 918.

Notably, in at least some examples, the transformation network 916 may be configured to generate a transformation matrix intended to convert the coordinates in the 2D system to the 3D system. Processes and operations are similar to those described above.

Figure 10:
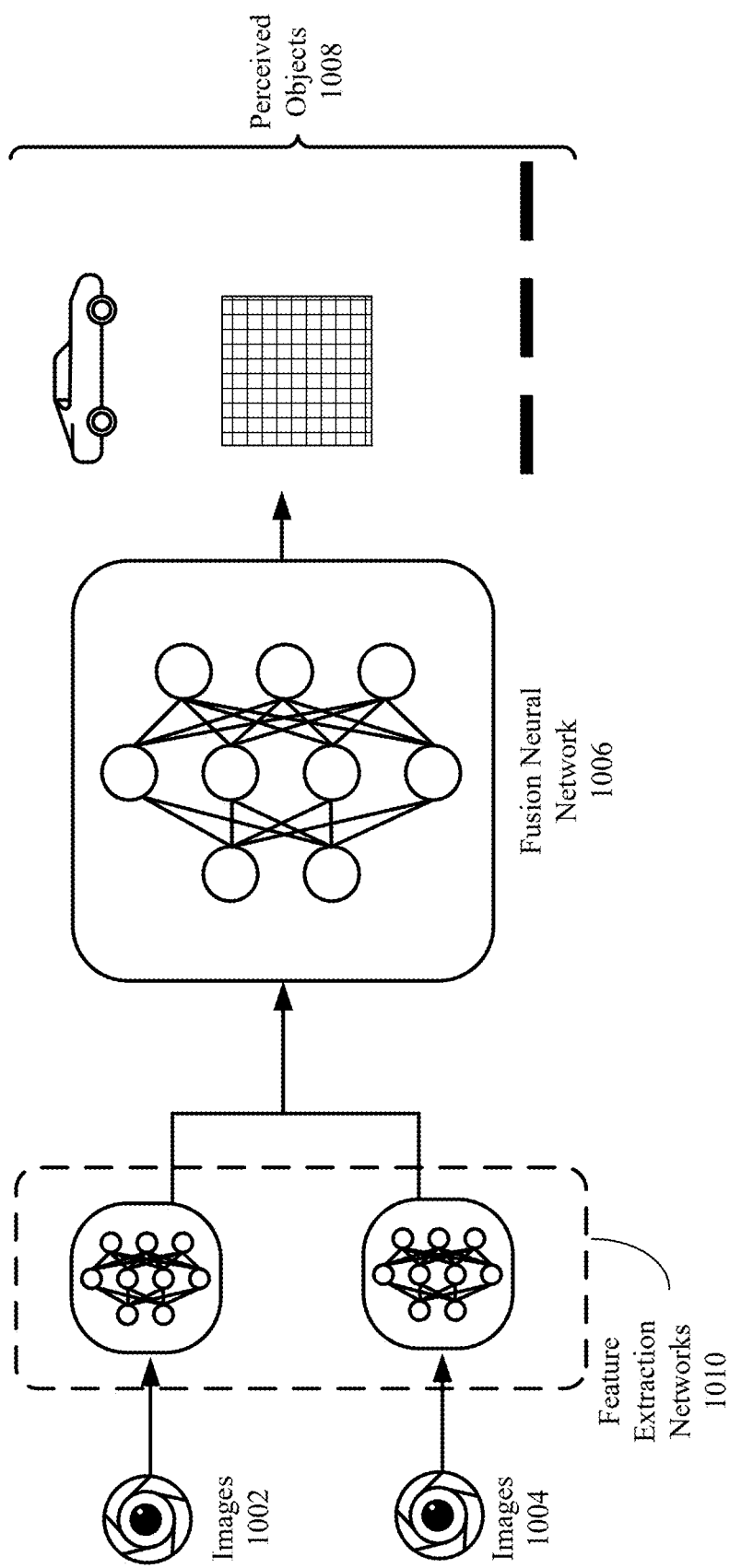
FIG. 10 illustrates a diagram showing another example neural network in the example autonomous driving system with air support in accordance with the disclosure.

FIG. 10 illustrates a diagram showing another example neural network in the example autonomous driving system with air support in accordance with the disclosure.

As described above, the first ground traffic information may be converted into the 2D coordinate system to be consistent with the second ground traffic information; the first ground traffic information and the second ground traffic information may then be combined to generate the world model. The world model may include information of the objects perceivable to the sensors of the UAV 104 and/or to the sensors of the land vehicle 102.

Alternatively, images 1002 collected by the UAV camera, e.g., 402, and images 1004 collected by the land vehicle camera, e.g., 412, may be submitted to a fusion neural network directly without a transformation of coordinates.

A system administrator (a person) may label the objects on the images 1002 and 1004 based on his/her experience to set ground truth values of the fusion neural network 1006. With sufficient teaching input by the system administrator, the fusion neural network 1006 may eventually detect the objects described in the images and the position information and output perceived objects 1008 (e.g., other vehicles on the road, accessible areas, lane dividing lines, etc.) as the results.

Figure 11:
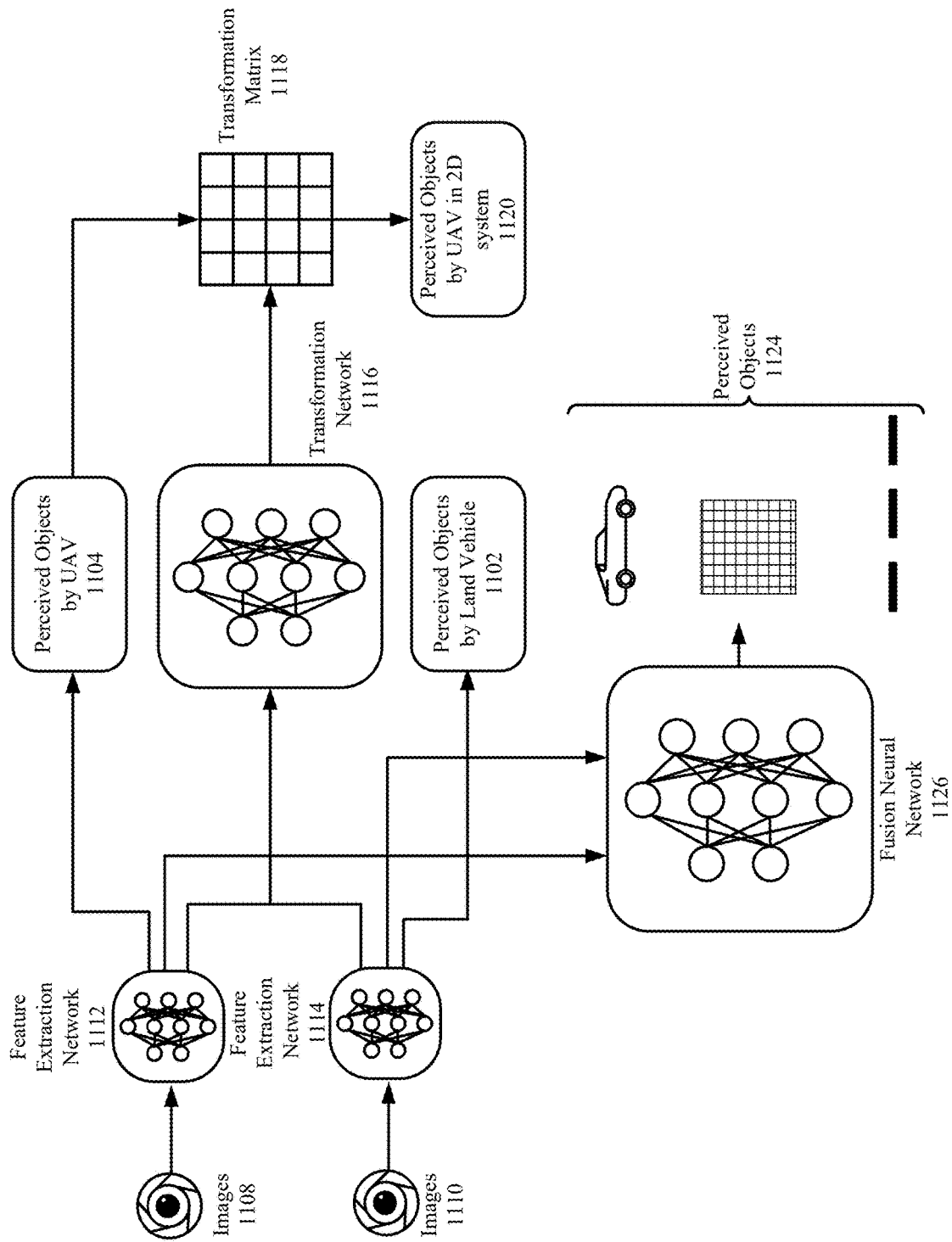
FIG. 11 illustrates a diagram showing an example combined structure of multiple neural networks in the example autonomous driving system with air support in accordance with the disclosure.

FIG. 11 illustrates a diagram showing an example combined structure of multiple neural networks in the example autonomous driving system with air support in accordance with the disclosure.

As depicted, the structure described in accordance with FIG. 9 may be combined with the fusion neural network described in FIG. 10.

Images 1108 collected by the UAV 104 and images 1110 collected by the land vehicle 102 may be input to feature extraction networks 1112 and 1114 respectively. Features of the perceived objects by UAV 1104 may be generated by the feature extraction network 1112; features of the perceived objects by land vehicle 1102 may be generated by the feature extraction network 1114. As described above in accordance with FIG. 9, the features can be utilized to generate a transformation matrix 1118. Meanwhile, the features can also be input to a fusion neural network 1126 to recognize objects in the images 1108 and 1110.

Although the transformation matrix 1118 may be not required to recognize the objects in the images 1108 and 1110, the transformation matrix 1118 may be utilized for future route planning and other decisions for autonomous driving.

Figure 12:
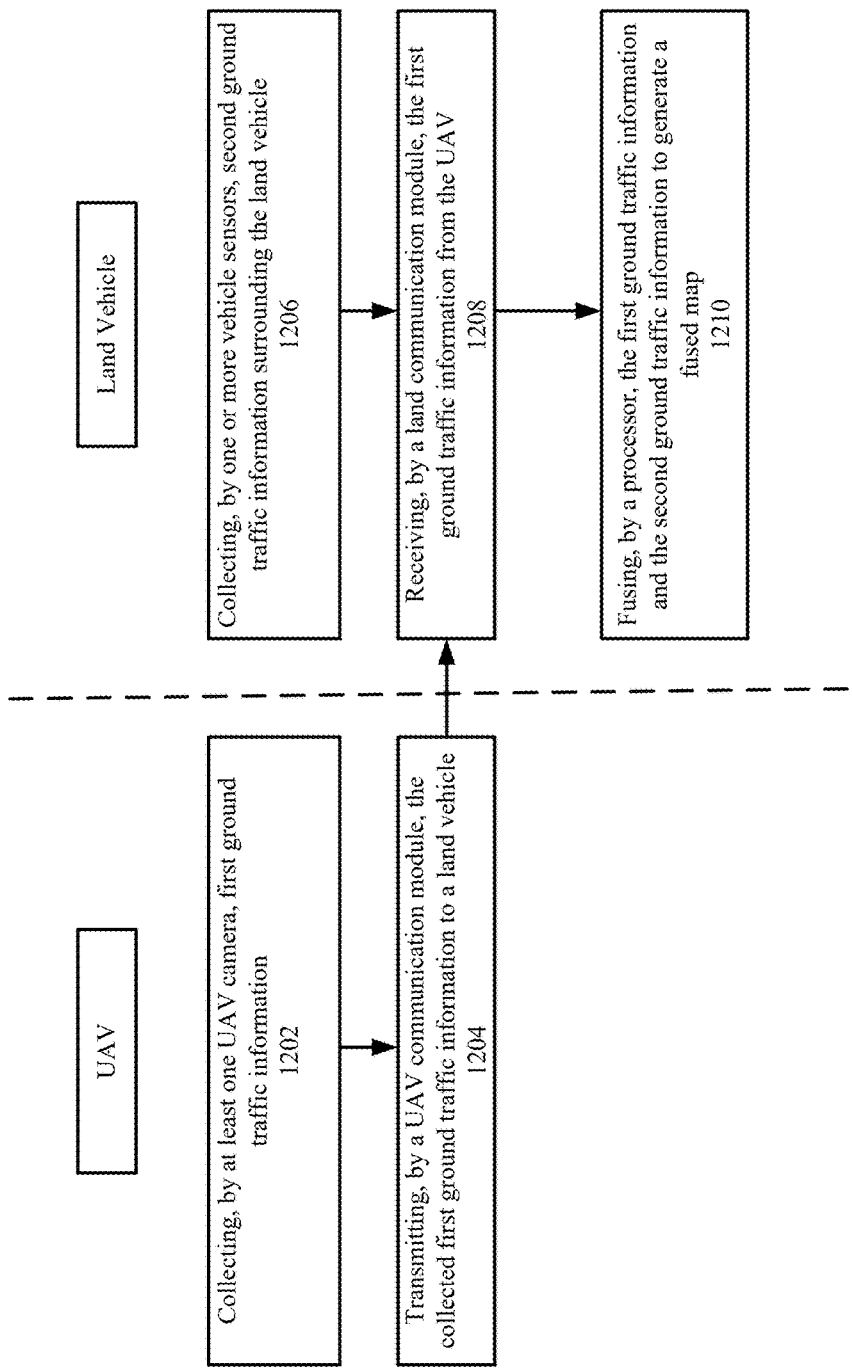
FIG. 12 illustrates a flow chart of an example method for performing autonomous driving in the example autonomous driving system in accordance with the disclosure.

FIG. 12 illustrates a flow chart of an example method for performing autonomous driving in the example autonomous driving system in accordance with the disclosure. The flowchart illustrates a process of implementing autonomous driving with air support.

At block 1202, the operations of the example method may include collecting, by at least one UAV camera, first raw sensor information. For example, the sensors on the UAV 104 may be configured to collect visual images and/or distances from ground objects to the UAV 104. The visual images and the distances may be further converted to first ground traffic information in a 3D coordinate system.

At block 1204, the operations of the example method may include transmitting, by a UAV communication module, the collected first ground traffic information to a land vehicle. For example, the first ground traffic information may then be transmitted to the land vehicle 102 via the UAV communication module 408.

At block 1206, the operations of the example method may include collecting, by one or more vehicle sensors, second raw sensor information surrounding the land vehicle. For example, the land vehicle camera 412 may be configured to capture images of the ground traffic surrounding the land vehicle 102. The land vehicle LiDAR sensor 414 and other land vehicle sensors 416 may be configured to determine distance information of the surrounding objects. Similarly, the collected images and distance information may be sent to a land vehicle processor 420 to be converted to the second ground traffic information.

At block 1208, the operations of the example method may include receiving, by a land communication module, the first ground traffic information from the UAV. For example, the land vehicle communication module 418 may be configured to receive the first ground traffic information from the UAV 104 via one or more wireless communication links.

At block 1210, the operations of the example method may include fusing, by a processor, the first ground traffic information and the second ground traffic information to generate a world model. For example, the land vehicle processor 420 may be configured to generate the world model. The world model may include a combination of the information collected respectively by the UAV 104 and the land vehicle 102. In some examples, the first ground traffic information in the 3D coordinate system may be converted to the 2D coordinate system with the land vehicle 102 as the coordinate origin. Such conversion may be performed by a processor of the UAV 104, a processor of the land vehicle 102, or a processor at the controller center 106.

Figure 13:
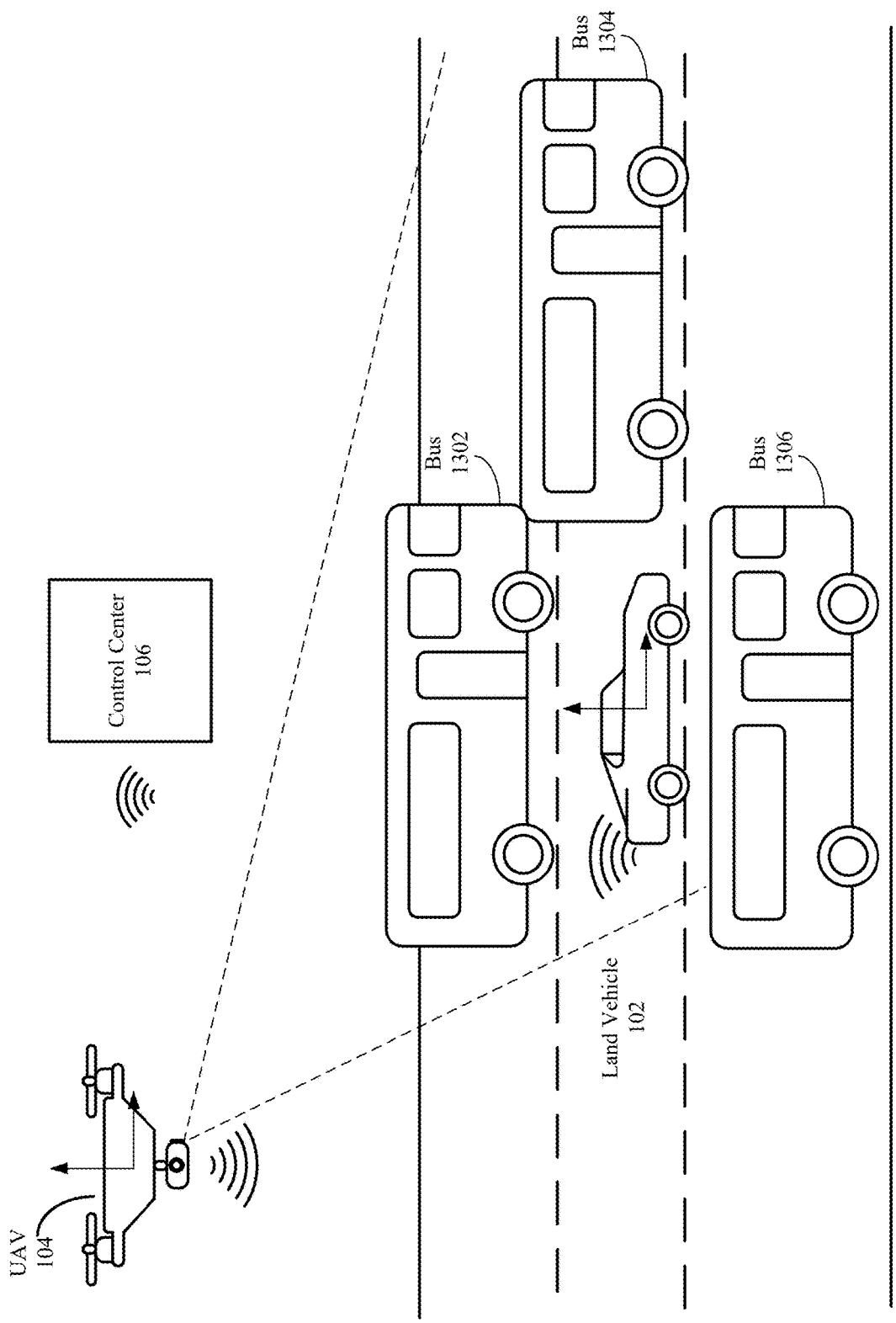
FIG. 13 illustrates a diagram showing the autonomous driving system with air support in an example scenario.

FIG. 13 illustrates a diagram showing the autonomous driving system with air support in an example scenario. As depicted, in some example scenario, while multiple vehicles are travelling around the land vehicle 102, sensors on the land vehicle 102 may be blocked and cannot identify necessary information to determine the position of the land vehicle 102 itself, which may further lead to incorrect driving decisions such as running a red light or missing an exit.

In this example scenario, since the first ground traffic information includes the position of the land vehicle and other objects unperceivable by the sensors on land vehicle 102, the world model may include the information necessary for generating correct driving decisions, e.g., changing lane when approaching the exist.

The process and method as depicted in the foregoing drawings may be executed through processing logics including hardware (e.g., circuit, special logic, etc.), firmware, software (e.g., a software embodied in a non-transient computer readable medium), or combination of each two. Although the above describes the process or method in light of certain sequential operation, it should be understood that certain operation described herein may be executed in different orders. Additionally, some operations may be executed concurrently rather than sequentially.

In the above description, each embodiment of the present disclosure is illustrated with reference to certain illustrative embodiments. Any of the above-mentioned components or devices may be implemented by a hardware circuit (e.g., application specific integrated circuit (ASIC)). Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An autonomous driving system, comprising:
an unmanned aerial vehicle (UAV) in the air, wherein the UAV includes:
at least one UAV camera configured to collect first raw sensor information,
wherein the first raw sensor information comprises visual images and distances from ground objects to the UAV,
a UAV processor configured to convert the first raw sensor information to first ground traffic information in a three-dimensional (3D) coordinate system, and
a UAV communication module configured to transmit the collected first ground traffic information,
wherein the UAV communication module is further configured to transmit the collected first ground traffic information to one or more additional UAVs or one or more control centers; and
a land vehicle communicatively connected to the UAV in the air, wherein the land vehicle is configured to store the UAV, wherein the land vehicle is configured to charge the UAV, wherein the land vehicle is configured to release or launch the UAV, and wherein the land vehicle further comprises:
one or more vehicle sensors configured to collect second raw sensor information surrounding the land vehicle,
wherein the second raw sensor information comprises visual images and distances from surrounding objects to the land vehicle,
a land vehicle processor configured to convert the second raw sensor information to second ground traffic information in a two-dimensional (2D) coordinate system,
wherein the land vehicle processor is configured to determine a direction associated with the ground objects and the surrounding objects based on the images captured by the respective raw sensor information,
wherein the land vehicle processor is further configured to release the UAV to a position of following or leading the land vehicle,
wherein the land vehicle processor is further configured to release the UAV when the land vehicle is approaching an intersection and the UAV is configured to fly toward the intersection, leading the land vehicle,
wherein when the UAV is at the intersection, the sensors of the UAV are further configured to collect first ground traffic information comprising positions of crosswalks, land dividing lanes, curb sides, and other vehicles, and
a land vehicle communication module configured to receive the first ground traffic information from the UAV,
wherein the land vehicle processor is further configured to convert the first ground traffic information in the three-dimensional (3D) coordinate system to the two-dimensional (2D) coordinate system,
wherein the land vehicle processor is further configured to combine the first ground traffic information and the second ground traffic information to generate a world model, wherein the world model is a dataset that includes coordinates of one or more still objects, predicted trajectories of one or more moving objects, coordinates of one or more traffic signals, and one or more accessible areas, and
wherein the land vehicle processor is further configured to generate decisions for the land vehicle based on the world model.

2. The autonomous driving system of claim 1, wherein the first ground traffic information is formatted in a coordinate system with a position of the UAV as a coordinate origin.

3. The autonomous driving system of claim 2, wherein the first ground traffic information includes:
 a position of the land vehicle in the coordinate system;
 first position information that indicates locations of the one or more still objects on the ground in the coordinate system with the position of the UAV as the coordinate origin;
 first motion information that indicates velocities of the one or more moving objects on the ground;
 first predicted trajectories of the one or more moving objects on the ground;
 first status information that indicates statuses of the one or more traffic signals; and
 first area information that indicates the one or more accessible areas to the land vehicle from a perspective of the UAV.

4. The autonomous driving system of claim 3, wherein the first position information of the one or more still objects is formed as one or more sets of coordinates in the coordinate system, one or more point clouds, one or more semantic segments, or features of the still objects extracted by a neural network.

5. The autonomous driving system of claim 1, wherein the second ground traffic information is formatted in a coordinate system with a position of the land vehicle as a coordinate origin.

6. The autonomous driving system of claim 5, wherein the second ground traffic information include:
 second position information that indicates locations of the one or more still objects surrounding the land vehicle in the coordinate system with the position of the land vehicle as the coordinate origin;
 second motion information that indicates velocities of the one or more moving objects surrounding the land vehicle;
 second predicted trajectories of the one or more moving objects surrounding the land vehicle;
 second status information that indicates statuses of the one or more traffic signals; and
 second area information that indicates the one or more accessible areas to the land vehicle from a perspective of the land vehicle.

7. The autonomous driving system of claim 6, wherein the second position information is formed as one or more sets of coordinates in the coordinate system, one or more point clouds, one or more semantic segments, or features of the still objects extracted by a neural network.

8. The autonomous driving system of claim 1, wherein the land vehicle processor is configured to:
 convert, by a transformation neural network running on the processor, the first ground traffic information from a first coordinate system with a position of the UAV as a coordinate origin to a second coordinate system with a position of the land vehicle as the coordinate origin,
 convert, by the transformation neural network running on the processor, coordinates of the one or more still objects, the one or more moving objects, the one or more traffic signals, and the one or more accessible areas and predicted trajectories of the one or more moving objects identified in the first coordinate system to coordinates in the second coordinate system; and
 determine the coordinates of the one or more still objects, the one or more moving objects, the one or more traffic signals, and the one or more accessible areas in the world model based on the converted coordinates and the second ground traffic information.

9. The autonomous driving system of claim 1, wherein the land vehicle processor is configured to:
 convert, by a transformation neural network running on the processor, semantic segments of the one or more still objects, the one or more moving objects, the one or more traffic signals, and the one or more accessible areas identified in the first coordinate system to semantic segment in the second coordinate system; and
 determine semantic segments of the one or more still objects, the one or more moving objects, the one or more traffic signals, and the one or more accessible areas and the predicted trajectories of the one or more moving objects identified in the world model based on the converted semantic segment and the second ground traffic information.

10. The autonomous driving system of claim 1, wherein the land vehicle processor is configured to:
 convert, by a transformation neural network running on the processor, point clouds of the one or more still objects, the one or more moving objects, the one or more traffic signals, and the one or more accessible areas identified in the first coordinate system to point clouds in the second coordinate system; and
 determine point clouds of the one or more still objects, the one or more moving objects, the one or more traffic signals, and the one or more accessible areas and predicted trajectories of the one or more moving objects identified in the world model based on the converted point clouds and the second ground traffic information.

11. A land vehicle in an autonomous driving system, comprising:
 a land vehicle communication module configured to receive first ground traffic information surrounding the land vehicle, wherein the first ground traffic information is generated by an unmanned aerial vehicle (UAV) in the air;
 wherein the land vehicle is configured to store the UAV, wherein the land vehicle is configured to charge the UAV, and wherein the land vehicle is configured to release or launch the UAV,
 wherein the first ground traffic information comprises visual images and distances from ground objects to the UAV,
 wherein the first ground traffic information is in a three-dimensional (3D) coordinate system,
 one or more vehicle sensors configured to collect second ground traffic information surrounding the land vehicle;
 wherein the second ground traffic information comprises visual images and distances from surrounding objects to the land vehicle,
 wherein the second ground traffic information is in a two-dimensional (2D) coordinate system,
 a land vehicle processor configured to combine the first ground traffic information and the second ground traffic information to generate a world model;
 wherein the land vehicle processor is configured to determine a direction associated with the ground objects and the surrounding objects based on the images captured by the respective sensor information,
 wherein the land vehicle processor is further configured to convert the first ground traffic information in the three-dimensional (3D) coordinate system to the two-dimensional (2D) coordinate system, wherein the land vehicle processor is further configured to generate decisions for the land vehicle based on the world model, wherein the land vehicle processor is further configured to release the UAV to a position of following or leading the land vehicle, wherein the land vehicle processor is further configured to release the UAV when the land vehicle is approaching an intersection and the UAV is configured to fly toward the intersection, leading the land vehicle, wherein when the UAV is at the intersection, the sensors of the UAV are further configured to collect first ground traffic information comprising positions of crosswalks, land dividing lanes, curb sides, and other vehicles, and wherein the world model is a dataset that includes coordinates of one or more still objects, predicted trajectories of one or more moving objects, coordinates of one or more traffic signals, and one or more accessible areas.

12. The land vehicle of claim 11, wherein the first ground traffic information is formatted in a coordinate system with a position of the UAV as a coordinate origin.

13. The land vehicle of claim 12, wherein the first ground traffic information includes:
a position of the land vehicle in the coordinate system;
first position information that indicates locations of the one or more still objects on the ground in the coordinate system with the position of the UAV as the coordinate origin;
first motion information that indicates velocities of the one or more moving objects on the ground;
first predicted trajectories of the one or more moving objects on the ground;
first status information that indicates statuses of the one or more traffic signals; and
first area information that indicates the one or more accessible areas to the land vehicle from a perspective of the UAV.

14. The land vehicle of claim 13, wherein the first position information of the one or more still objects is formed as one or more sets of coordinates in the coordinate system, one or more point clouds, one or more semantic segments, or features of the still objects extracted by a neural network.

15. The land vehicle of claim 11, wherein the second ground traffic information is formatted in a coordinate system with a position of the land vehicle as a coordinate origin.

16. The land vehicle of claim 15, wherein the second ground traffic information include:
second position information that indicates locations of the one or more still objects surrounding the land vehicle in the coordinate system with the position of the land vehicle as the coordinate origin;
second motion information that indicates velocities of the one or more moving objects surrounding the land vehicle;
second predicted trajectories of the one or more moving objects surrounding the land vehicle;
second status information that indicates statuses of the one or more traffic signals; and
second area information that indicates the one or more accessible areas to the land vehicle from a perspective of the land vehicle.

17. The land vehicle of claim 16, wherein the second position information is formed as one or more sets of coordinates in the coordinate system, one or more point clouds, one or more semantic segments, or features of the still objects extracted by a neural network.

18. The land vehicle of claim 11, wherein the land vehicle processor is configured to:
convert, by a transformation neural network running on the land vehicle processor, the first ground traffic information from a first coordinate system with a position of the UAV as a coordinate origin to a second coordinate system with a position of the land vehicle as the coordinate origin,
convert, by the transformation neural network running on the land vehicle processor, coordinates of the one or more still objects, the one or more moving objects, the one or more traffic signals, and the one or more accessible areas and predicted trajectories of the one or more moving objects identified in the first coordinate system to coordinates in the second coordinate system; and
determine the coordinates of the one or more still objects, the one or more moving objects, the one or more traffic signals, and the one or more accessible areas in the world model based on the converted coordinates and the second ground traffic information.

19. The land vehicle of claim 11, wherein the land vehicle processor is configured to:
convert, by a transformation neural network running on the land vehicle processor, semantic segments of the one or more still objects, the one or more moving objects, the one or more traffic signals, and the one or more accessible areas identified in the first coordinate system to semantic segment in the second coordinate system; and
determine semantic segments of the one or more still objects, the one or more moving objects, the one or more traffic signals, and the one or more accessible areas and the predicted trajectories of the one or more moving objects identified in the world model based on the converted semantic segment and the second ground traffic information.

20. The land vehicle of claim 11, wherein the land vehicle processor is configured to:
convert, by a transformation neural network running on the land vehicle processor, point clouds of the one or more still objects, the one or more moving objects, the one or more traffic signals, and the one or more accessible areas identified in the first coordinate system to point clouds in the second coordinate system; and
determine point clouds of the one or more still objects, the one or more moving objects, the one or more traffic signals, and the one or more accessible areas and predicted trajectories of the one or more moving objects identified in the world model based on the converted point clouds and the second ground traffic information.

* * * * *